United States Patent [19]

Raahauge

[11] Patent Number: 4,928,121
[45] Date of Patent: May 22, 1990

[54] UNIVERSAL PLOTTER PEN HAVING IMPROVED MARKING FLUID FLOW CHARACTERISTICS

[75] Inventor: Jerald C. Raahauge, San Jose, Calif.

[73] Assignee: Summer & Taylor, Inc., San Jose, Calif.

[21] Appl. No.: 271,910

[22] Filed: Nov. 16, 1988

[51] Int. Cl.⁵ .................. G01D 15/16; B43K 23/02; B43K 5/14

[52] U.S. Cl. .................. 346/140 R; 346/140 A; 33/1 M; 33/18.1; 401/137; 401/132; 401/133; 401/134; 401/135

[58] Field of Search .................. 346/140 A, 140 R; 33/1 M, 18.1; 401/131, 132, 133, 134, 135

[56] References Cited

U.S. PATENT DOCUMENTS 3,687,561  8/1972  Phillips .................. 401/134

FOREIGN PATENT DOCUMENTS 1952885  4/1970  Fed. Rep. of Germany ...... 401/133
2257199  9/1973  Fed. Rep. of Germany ...... 401/135
1222406  2/1971  United Kingdom .................. 401/133

Primary Examiner—Bruce A. Reynolds
Assistant Examiner—Huan Tran
Attorney, Agent, or Firm—John J. Leavitt

[57] ABSTRACT

Presented in four different aspects is a plotter pen of the type utilized in an X-Y plotter mechanism controlled by computer to select a given plotter pen from a group of such pens and to mount the selected pen in the mechanism in position of use. In one aspect there is presented a universal cartridge for containing a marking fluid, which may be used with different marking "points" or "nibs", and which is expendable when the marking fluid in the cartridge is exhausted. In another aspect, there is presented a plotter pen that utilizes a disposable cartridge containing a marking fluid and which is equipped with a marking fluid flow control mechanism or system to control the flow of marking fluid from the plotter pen. In still another aspect, there is presented as an article of manufacture a marking fluid flow control mechanism for attachment to a disposable cartridge containing marking fluid to be controlled. Yet another aspect of the invention involves a disposable cartridge having sealed therewithin a quantity of marking fluid, and having a mounting section on one end of the disposable cartridge for the reception of selected peripheral equipment such as different marking "points" or "nibs" suitable for specific plotting requirements.

40 Claims, 5 Drawing Sheets

U.S. Patent    May 22, 1990    Sheet 1 of 5    4,928,121
FIG_1
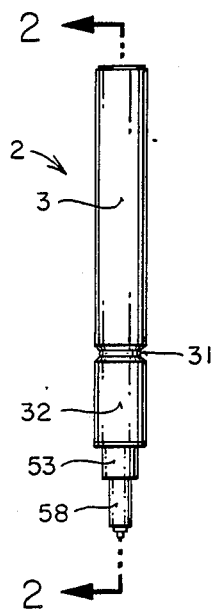
FIG_2A
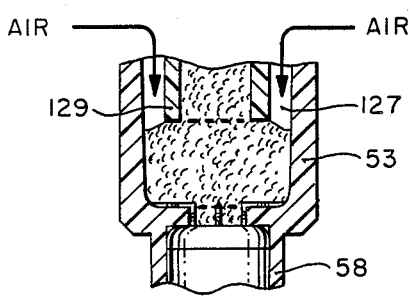
FIG_2B
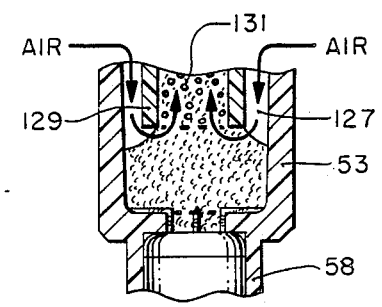
FIG_2
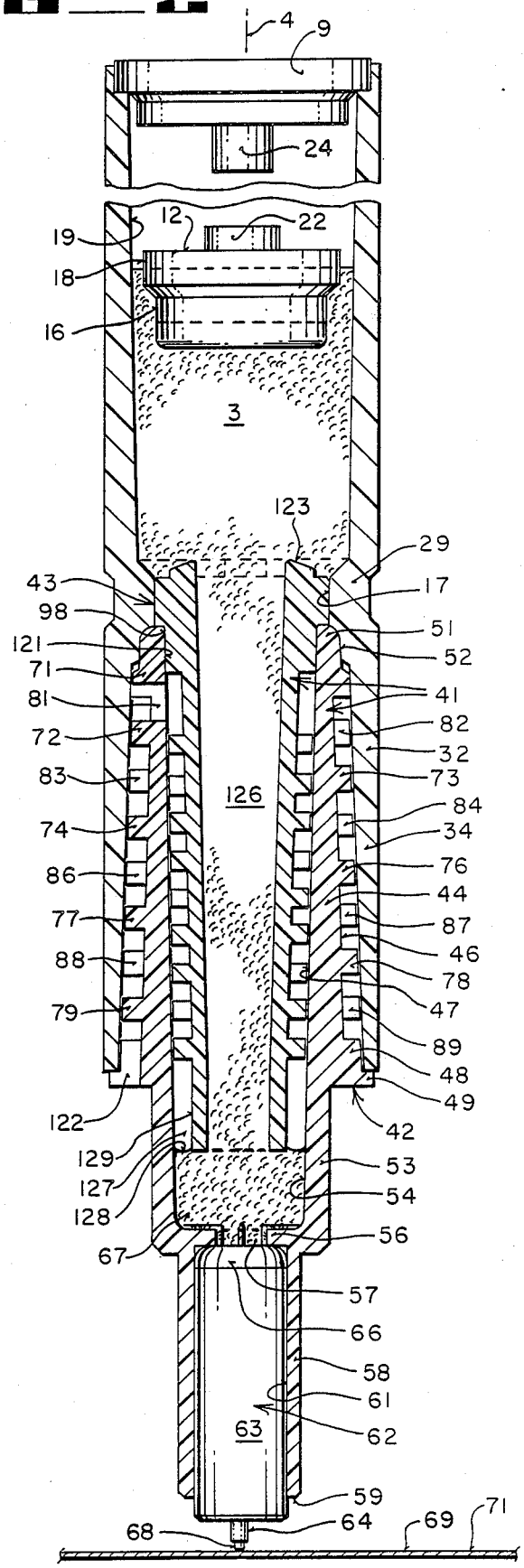

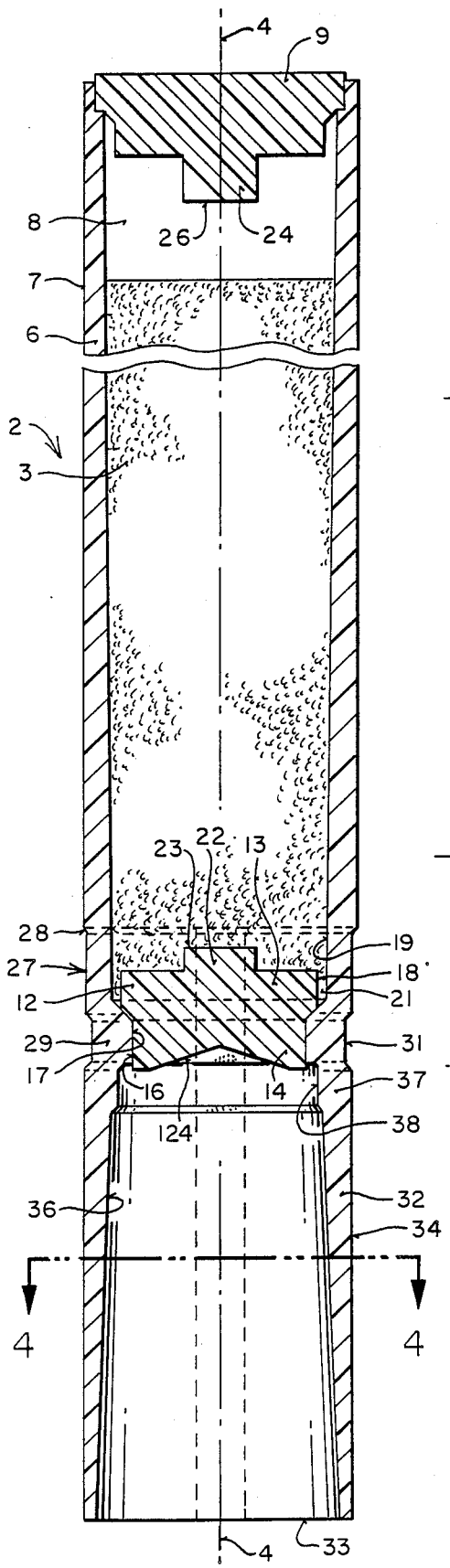
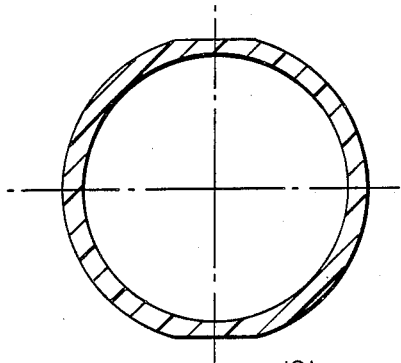
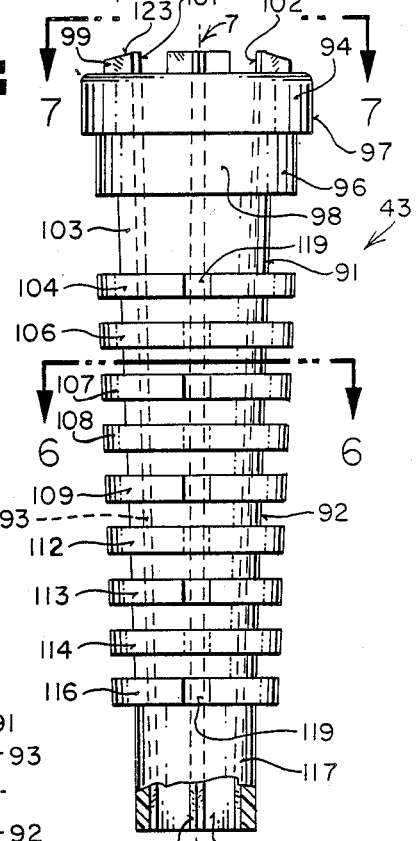
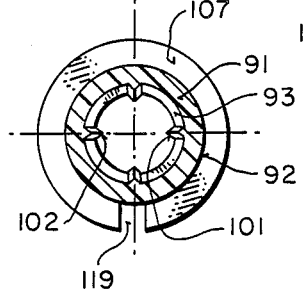
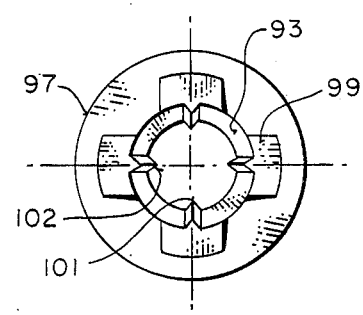

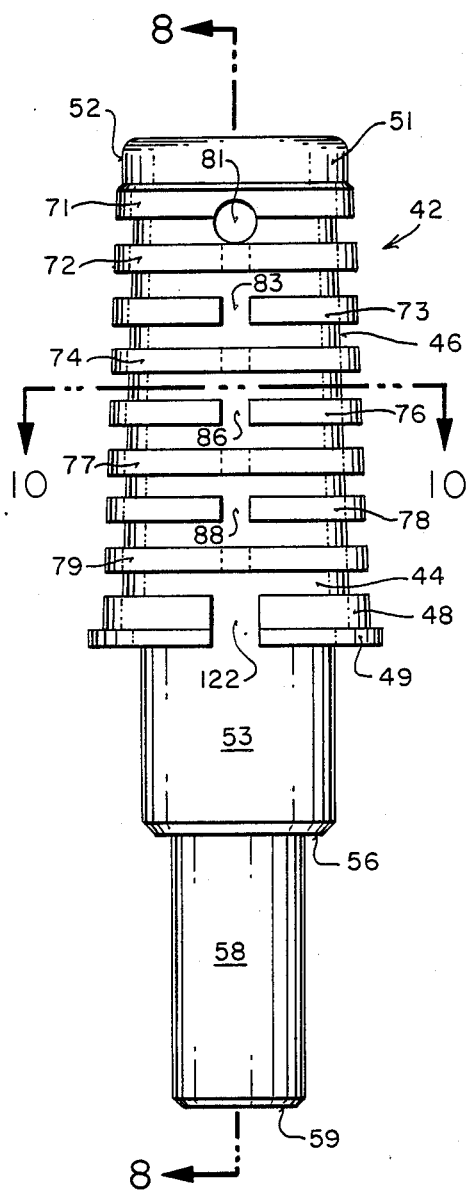
FIG_8
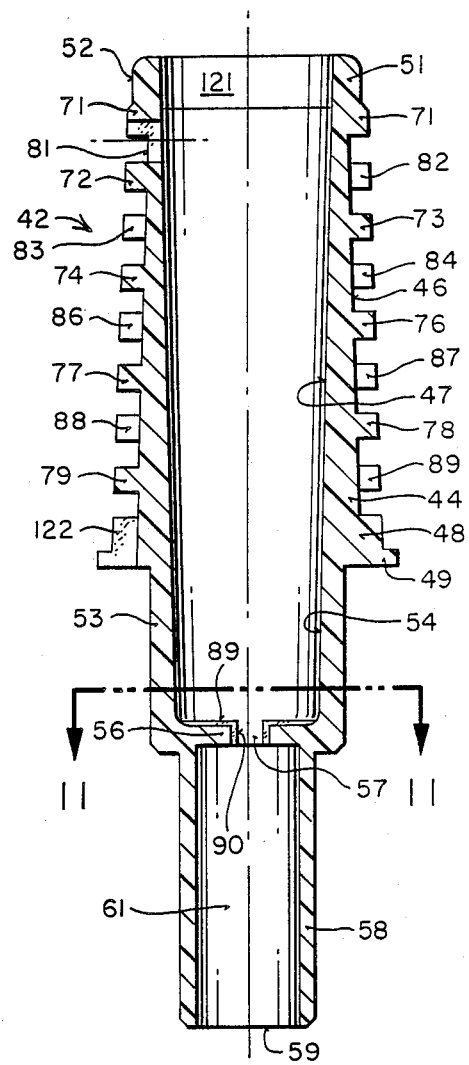
FIG_9
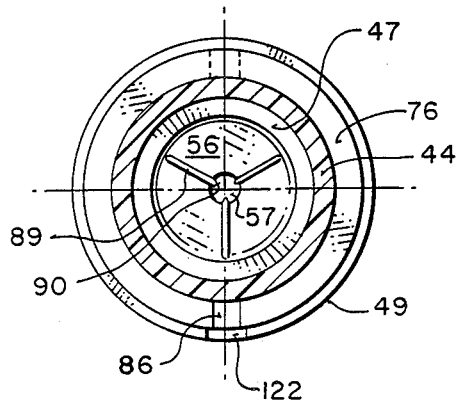
FIG_10
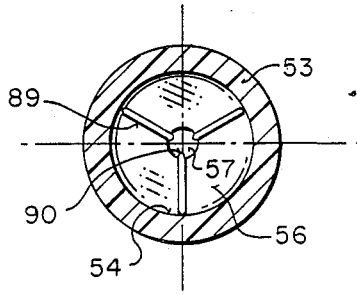
FIG_11

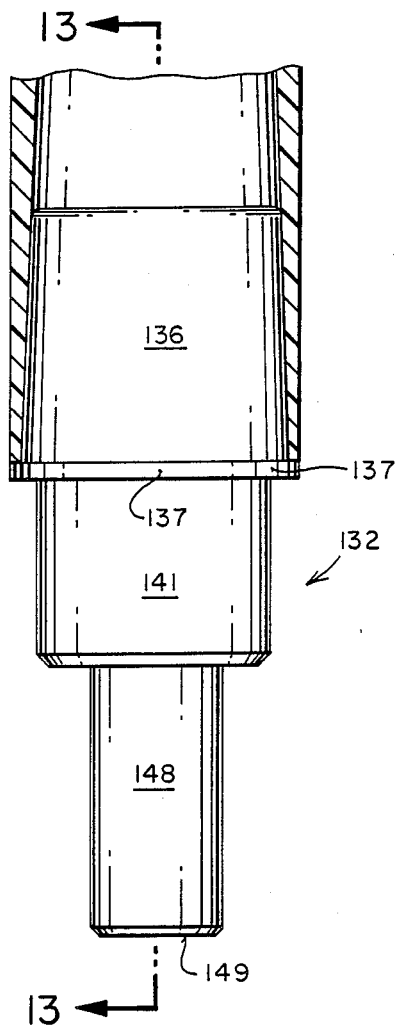
FIG_12
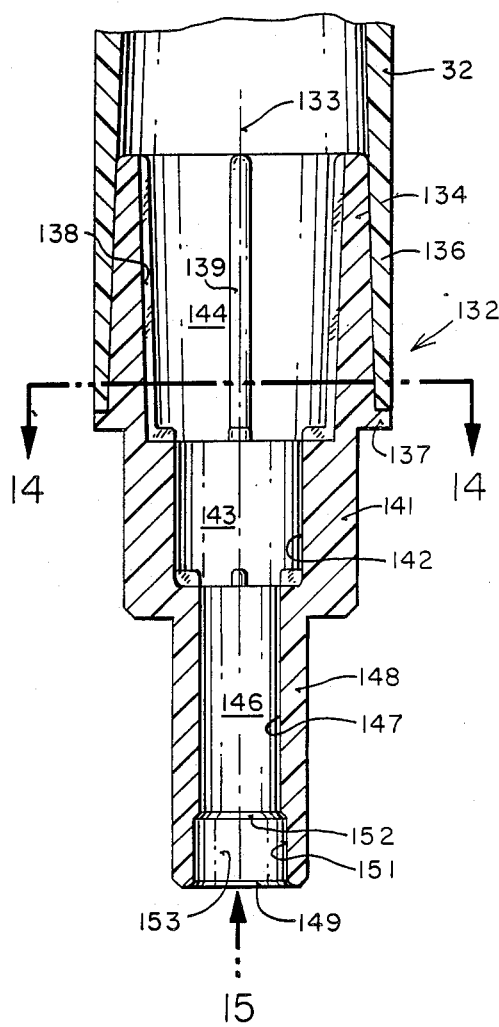
FIG_13
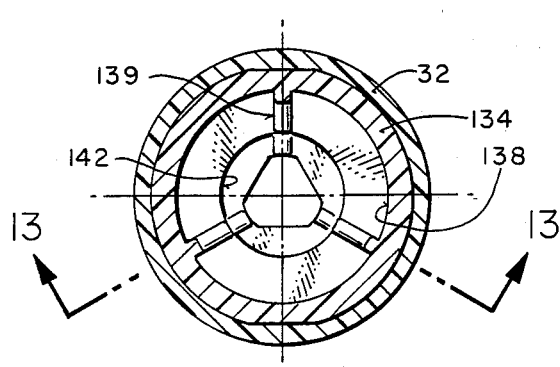
FIG_14
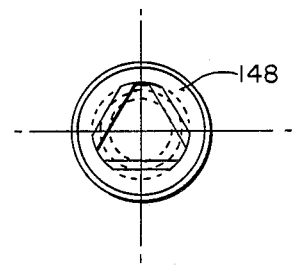
FIG_15

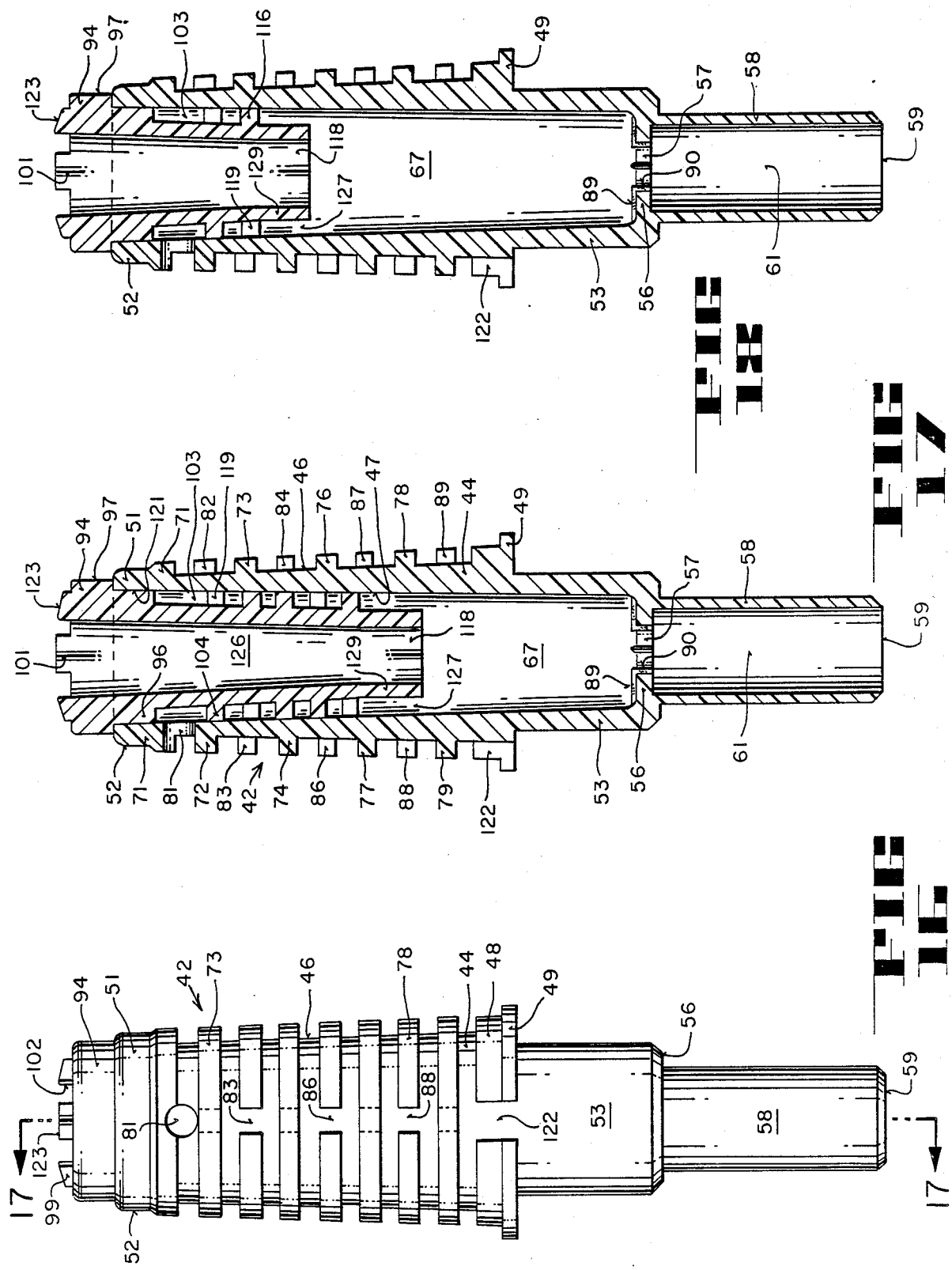

UNIVERSAL PLOTTER PEN HAVING IMPROVED MARKING-FLUID FLOW CHARACTERISTICS

BACKGROUND OF THE INVENTION

1. Field of the Invention.

This invention relates to plotter pens of the type that are used in X-Y plotter mechanisms, and particularly to a plotter pen that incorporates an improved marking fluid delivery method and structure.

2. Description of the Prior Art.

A search for pertinent prior art patents has revealed the existence of the following U.S. patents:

| | | |
|---|---|---|
| 2,711,810 | 4,121,224 | 4,015,269 |
| 4,157,552 | 4,274,102 | 4,540,993 |
| 4,540,995 | 4,608,576 | 4,736,211 |

While the patents listed are pertinent to the subject matter of marking devices, none appear to be directed specifically to the construction of a plotter pen per se, to disposable cartridge for such a plotter pen, or to the marking fluid delivery system for such a pen.

The advent of computer graphics, computer assisted drafting, and computer assisted design has emphasized the need for a plotter pen which when inserted in the plotter pen head assembly of an X-Y plotter mechanism, will function reliably to permit initiation and continuous flow of the marking fluid contained within the plotter pen once plotting has commenced. Accordingly, one of the objects of the present invention is to provide a plotter pen that incorporates improved marking fluid delivery means interconnecting the marking fluid reservoir and the marking nib through which the marking fluid is released onto the media on which plotting is effected.

Because of the recent development of computer assisted drafting and computer graphics, only a limited number of companies have endeavored to produce X-Y plotter mechanisms, and each of these companies in most instances have tended to produce plotter pens of their own design that are dedicated to their particular X-Y plotter mechanism. As a consequence of the diversity of plotter mechanisms, there has developed a diversity in the different types of plotter pens that are available on the commercial market. It appears that the industry has not "aged" sufficiently to enable standardization and interchangeability of peripheral equipment from one X-Y plotter to another from a different manufacturer. In an attempt to accomplish such interchangeability, at least one company has specialized in the production of adaptors that make the different pens useable with different X-Y plotter mechanisms when coupled with an appropriate adaptor. Accordingly, another object of the present invention is the provision of a plotter pen design that is universally applicable in most X-Y plotter mechanisms when coupled with a new and novel adaptor system forming the subject matter of a copending application by the inventor named herein.

One of the major problems that has plagued plotter pen manufacturers on the one hand and plotter pen users on the other hand, is the tendency of the marking fluid in the pen to dry at critical locations in the delivery path between the marking fluid reservoir and the marking nib through which the marking fluid is released. Such drying of the marking fluid forms a blockage that prevents the marking fluid remaining in the plotter pen from being used unless the blockage is cleared, and this is frequently more expensive than replacing the pen with a fresh one, thus leading to a waste of the marking fluid remaining in the pen. Accordingly, another object of the present invention is the provision of a plotter pen that includes an improved marking fluid delivery system that minimizes the tendency of the marking fluid to dry within the delivery system, and which promotes complete use of all of the marking fluid within the pen.

Still another problem that has plagued the "user" industry of plotter pens is the tendency of many plotter pens to leak marking fluid once they have been removed from the X-Y plotter mechanism and laid aside for future use or for being discarded. Such a plotter pen that leaks can ruin work in progress by leaking marking fluid indiscriminately on the surface of the media being plotted. Accordingly, a still further object of the present invention is the provision of a plotter pen incorporating a marking fluid delivery system that inhibits the free flow of marking fluid from the pen when the pen is not in use.

In the operation of a plotter pen, it is desirable that the marking fluid flowing from the marking nib of the pen flow therefrom with consistency in terms of volume. Manufacturers of conventional pens attempt to achieve such consistency by inserting plungers or rods in the marking nib in an attempt to control the cross-sectional area of the passageway through which the marking fluid passes. Accordingly, another object of the present invention is the provision of an improved plotter pen in which consistent flow of the marking fluid is achieved.

With conventional pens, one of the problems that has occurred is that when a pen that has been in use is taken from the X-Y plotter and laid aside, and then subsequently picked up for reuse, the placement of the pen in a horizontal position causes displacement of the marking fluid in such a way that when the pen is again mounted for use, there is a tendency for the pen to leak, causing spills on the plotter mechanism, the operator and the media on which plotting is progressing. Accordingly, another object of the present invention is the provision of an improvement in a plotter pen which enables the plotter pen to be laid aside for a time and then be re-used without concern that the pen will leak or spill marking fluid.

I have found that one of the parameters that is extremely important in connection with the consistent flow of marking fluid from a plotter pen is the weight of the fluid in the fluid reservoir and the imposition of that weight on the incremental column of marking fluid that passes through the marking point. Accordingly, one of the important objects of this invention is the provision of a marking fluid delivery system for a plotter pen that incorporates means and a method for maintaining the weight of the marking fluid substantially constant in relation to the incremental column passing through the marking point.

There are several different types of liquid ink or liquid marking fluid pens that are available on the commercial market. Many of these pens are categorized by the type of marking fluid that they contain. For instance, there are multi-media pens which may be defined as plotter pens capable of marking on many different types of media, including paper, plastic, and foil. Other types of pens utilize inks or marking fluids that are particularly useful for etching. In this type plotter pen, the marking fluid reacts chemically with the surface of the media with which it is in contact, and thereby produces a "mark". In addition to the two foregoing types of plotter pens, there is the so-called "roller ball" pen for use in connection with special types of plotter paper. Sometimes it is not so much the type of marking fluid that is dispensed by a plotter pen that defines a difference, but the type of "nib" or "point" that is used in the plotter pen. For instance, some plotter pens include stainless steel points which are touted as useful for precision automated drafting. For matte drafting film, tungsten carbide points are touted as being effective because they provide wear resistance against the abrasive nature of the film on which the "nib" or "point" is being used.

For matte drafting film, plotter pens are provided with jewel-tipped points or carbide "points" because they provide a superior performance. One of the characteristics that is common to all of these plotter pens is that they must have a cartridge to retain the marking fluid. Again, marking fluid cartridges are made in many different configurations and sizes. Accordingly, another object of the present invention is the provision of a plotter pen that utilizes a "universal" cartridge that may incorporate any of the plotter "points" or "nibs" described above for use in special circumstances.

The invention possesses other objects and features of advantage, some of which, with the foregoing, will be apparent from the following description and the drawings. It is to be understood however, that the invention is not limited to the embodiment illustrated and described since it may be embodied in various forms within the scope of the appended claims.

SUMMARY OF THE INVENTION

In terms of broad inclusion, the universal plotter pen and method of the invention comprises an elongated tubular assembly including a cartridge body that may be universally accepted in the adaptor forming the subject matter of my copending application. The universal cartridge is constructed in such a way that there is defined within the hollow interior of the tubular cartridge body a reservoir for marking fluid adjacent one end, and a mounting section for a marking fluid control mechanism adjacent the other end of the tubular cartridge body.

Initially, i.e., prior to insertion of the marking fluid delivery means into an open end of the tubular cartridge body, one end wall of the marking fluid reservoir is formed by a displaceable plug that seals the marking fluid in the reservoir cavity. Upon insertion of the marking fluid delivery mechanism, sometimes referred to as the "plotting point", into the tubular cartridge, the plotting point effects a dislodgement of the plug which is buoyant and which then rises through the body of marking fluid contained within the reservoir cavity to rest buoyantly on the top of the column of marking fluid, and to recede with it as the body of marking fluid flows into the marking fluid delivery system and is expended through the marking fluid nib or point. The marking fluid delivery mechanism includes a tubular outer member adapted to be press-fitted into the inner periphery of the open end of the tubular cartridge body, and an inner tubular member contained concentrically within the outer tubular member and forming a direct passageway connecting with the interior of the marking fluid reservoir and the marking fluid therein. The outer tubular member forming a part of the marking fluid delivery system includes a tubular terminal portion adapted to receive a "nib" assembly or "point" correlated to the type of use intended for the pen. The inner and outer tubular members of the marking fluid delivery system are provided with a multiplicity of radially outwardly extending annular fins or flanges defining annular cavities within the tubular cartridge body that are subjected to atmospheric pressure through appropriate ports. Means are provided disposed between the inner and outer tubular marking fluid delivery system members for containing a predetermined amount of marking fluid in an auxiliary pool or reservoir thereof that is in free-flowing communication with the marking fluid in the main reservoir, which is also in flowing communication with a marking nib or point, and which is always subjected to atmospheric pressure. The relationship of the inner member may be changed to vary the volume of the auxiliary reservoir to modify the flow characteristics of the pen. Means are provided detachably secured to the "nib" assembly or point for protecting the "nib" assembly or point when the plotter pen is not in use.

BRIEF DESCRIPTION OF THE DRAWINGS

FIG. 1 is an elevational view shown approximately actual size of my universal cartridge equipped with a marking fluid delivery system mounted thereon.

FIG. 2 is an enlarged cross-sectional view taken in the plane indicated by the line 2—2 of FIG. 1.

FIG. 2(A) is a fragmentary cross-sectional view of the auxiliary reservoir of the pen illustrating the affect on the surface of the marking fluid in the reservoir when marking fluid commences to flow through the pen.

FIG. 2(B) is a fragmentary cross-sectional view similar to FIG. 2(A) and illustrating the further affect consisting of the passage of minute bubbles through the marking fluid effective to maintain atmospheric pressure on the marking fluid within the primary reservoir to insure a smooth and continuous flow of such marking fluid during use of the pen.

FIG. 3 is an enlarged longitudinal cross-sectional view of my universal cartridge body apart from other structure, temporarily sealed and filled with a marking fluid.

FIG. 4 is a horizontal cross-sectional view taken in the plane indicated by the line 4—4 in FIG. 3.

FIG. 5 is an enlarged elevational view of the marking fluid flow regulator member forming a part of the marking fluid delivery system adapted to be mounted in the open end of the universal cartridge illustrated in FIG. 3, illustrated apart from other structure.

FIG. 6 is an enlarged horizontal cross-sectional view taken in the plane indicated by the line 6—6 in FIG. 5.

FIG. 7 is an enlarged elevational view of the inner end of the marking fluid flow regulator illustrated in FIG. 5, taken in the direction of the arrows 7 in FIG. 5.

FIG. 8 is an enlarged elevational view of the pressure equalizer member forming another part of the marking fluid delivery system, shown apart from other structure.

FIG. 9 is a vertical cross-sectional view taken in the plane indicated by the line 9—9 in FIG. 8.

FIG. 10 is a horizontal cross-sectional view taken in the plane indicated by the line 10—10 of FIG. 8.

FIG. 11 is a horizontal cross-sectional view taken in the plane indicated by the line 11—11 in FIG. 9.

FIG. 12 is an enlarged elevational view of an insert adapted to be substituted for the marking fluid delivery mechanism illustrated in FIGS. 2, 5, 8, and 16, to adapt the universal cartridge for use in connection with fiber, plastic or roller ball type pens.

FIG. 13 is a vertical cross-sectional view taken in the plane indicated by the line 13—13 in FIG. 14.

FIG. 14 is a horizontal cross-sectional view taken in the plane indicated by the line 14—14 in FIG. 13.

FIG. 15 is an end elevational view taken in the direction of the arrow 15 in FIG. 13.

FIG. 16 is an elevational view of the marking fluid delivery system in assembled form, illustrated apart from other structure.

FIG. 17 is a vertical cross-sectional view taken in the plane indicated by the line 17—17 in FIG. 16, and illustrating a shortened marking fluid control member and enlarged auxiliary reservoir.

FIG. 18 is a vertical cross-sectional view similar to FIG. 17, but illustrating an even shorter marking fluid control member and an even larger auxiliary reservoir.

DESCRIPTION OF THE PREFERRED EMBODIMENT

In one aspect, this invention involves a universal plotter pen cartridge as an article of manufacture, to be filled with an appropriate marking fluid, sealed and sold as a unit to ultimate consumers for application by those ultimate consumers of whatever type "plotting point" and/or marking fluid delivery system they may choose to use with the universal cartridge.

In another aspect, the invention involves a marking fluid delivery system or mechanism as an article of manufacture and sale for mounting on the universal cartridge. The cartridge may be filled with any type of marking fluid useful to the ultimate consumer.

In a third aspect, the invention involves an insert member for application to the universal cartridge body, the insert being adapted to accommodate fiber, plastic and roller ball type plotter points.

Lastly, in a fourth aspect of the invention, the universal cartridge and the fluid delivery system or mechanism, or the cartridge and insert, may constitute cooperative combinations of these separate aspects to produce an operative plotter pen as illustrated in elevation in FIG. 1 and in section in FIG. 2.

Referring to FIG. 3, it will be seen that the universal cartridge of the invention includes an elongated tubular body designated generally by the numeral 2, preferably manufactured from a synthetic resinous material that may be either transparent or translucent so that the color and quantity of the marking fluid 3 contained within the reservoir portion of the cartridge may be visibly known, or the cartridge may be fabricated from completely opaque material and other means may be used for indicating the color and quantity of the marking fluid contained within the cartridge. In the interest of clarity in this description, the tubular cartridge as illustrated in FIG. 3 is shown with a vertical axis 4, this being the orientation in which the plotter pen assembly is normally used.

The universal cartridge includes a tubular wall 6, the outer periphery 7 of which is generally cylindrical, but perhaps tapered sufficiently to permit injection molding of the part and convenient withdrawal of the part from the mold. The tubular wall 6 encloses a hollow cavity 8 that extends from an end cap 9 of synthetic resinous material which sealingly closes the upper end of the tubular reservoir cavity 8 of the cartridge as shown, to a fluid-tight seal plug 12 of synthetic resinous material that defines the opposite end of the reservoir cavity, and which seals the reservoir cavity against the escape of marking fluid therefrom until the cartridge is put into use.

The seal plug 12 includes a body portion 13 that is generally symmetrical about the central axis 4, and includes a reduced-in diameter seal portion 14, the outer periphery 16 of which is press-fitted into the inner peripheral cylindrical surface 17 formed as a stricture in the universal cartridge tube 6 intermediate its ends. It should be noted that while the seal plug 12 is press-fitted into the cylindrical stricture surface 17, the plug may nevertheless be dislodged from its seat, when intended, to unseal the passageway defined by the cylindrical stricture surface 17. The seal plug 12 also includes a peripheral cylindrical surface 18 that is spaced radially inwardly from the inner periphery 19 of the tube 6, to provide an annular channel 21 between the cylindrical surface 18 of the seal plug and the inner peripheral surface 19 of the reservoir cavity wall 6.

As indicated above in the descriptions of the drawing figures, the scale of the universal cartridge as illustrated in FIG. 3 is greatly enlarged. To provide some sense of proportion, it should be noted that the annular space 21 when the seal plug is in the position illustrated, i.e., in sealing position, has a dimension of only about 0.025", with the maximum diameter of the seal plug being about 0.25". For identification purposes, the seal plug 12 is also provided with a boss 22 having a top surface 23 on which may be molded indicia, generally a number, for identification of the seal plug and correlation to other structure, such as the mold cavity wherein it was formed. In the same way, the seal plug 9 at the opposite end of the reservoir cavity is provided with a boss 24 having a surface 26 thereon, on which may be molded an appropriate indicia indicative of the identity of the plug and correlated to the mold cavity in which it was produced.

Intermediate the ends of the elongated universal cartridge tube 6, the outer peripheral wall 7 of the tube is reduced in diameter in a section designated generally by the numeral 27. The reduction in diameter at this point provides a shoulder 28 which coincides with the parting line of the mold, the shoulder thus accommodating any flash that might result from the molding process. As shown in the drawing, the tube section 27 of reduced diameter merges smoothly with the constricted wall section 29 of the tube, the outer peripheral surface 31 of which is of lesser diameter than the diameter of the section 27, with the remaining wall portion 32 of the universal cartridge tube 6 extending from the constricted wall portion 29 to the open end 33. The portion of the cartridge defined by the wall portion 32, i.e., from wall portion 29 to the open end 33, may be categorized as a mounting section for the marking fluid delivery system or assembly. As with the tubular section 6, the outer peripheral surface 34 of the wall portion 32 is tapered only sufficiently to provide adequate draft in the injection molding process, while a major portion of the inner periphery of the wall portion 32 is tapered as shown for purposes which will hereinafter be explained. At the root of the tapered wall section 32, next adjacent the constricted wall portion 29, the inner periphery 36 of the tubular portion 32 is reduced in diameter in a section 37 so that the inner peripheral surface 38 is generally cylindrical to form a seal seat for the marking fluid delivery system or mechanism adapted to be inserted into the open end 33 of the universal cartridge tube as will hereinafter be explained.

Referring to FIGS. 2, 5–11 and 16–18, there is there illustrated the details of the second aspect of the invention which comprises the marking fluid delivery system or mechanism that is adapted to be sealingly inserted into the open end 33 of the universal cartridge as illustrated in FIG. 3 to produce the assembly illustrated in FIG. 2. The marking fluid delivery system or mechanism is illustrated in assembled form in FIGS. 2, and 16–18, and is designated generally by the numeral 41. As there shown, the marking fluid delivery system comprises two main components designated generally by the numerals 42 and 43, each of these components being illustrated separately in the drawings in FIGS. 5, 8 and 9, and assembled in FIGS. 2 and 16–18. For instance, the component 42 (FIGS. 8 and 9), which may be categorized as the outer conical member, functions both as a mounting member for the component 43 (FIG. 5), and also as a means of venting or equalizing pressure between the inside of the marking fluid reservoir cavity and the ambient atmospheric pressure. The construction of the component 42 is illustrated apart from any other structure in FIGS. 8–11. In like manner, the component 43 may be categorized as the marking fluid flow regulator member and, as illustrated in FIGS. 2 and 16–18, is coaxially related with respect to the pressure equalizer member 42 and is also coaxially mounted on the tubular universal cartridge 2.

Referring first to the pressure equalizer mounting member 42 illustrated in FIGS. 2 and 8–11 and 16–18, it will be seen that the pressure equalizer member 42 is generally symmetrical about a longitudinal axis and includes a main body portion 44 having a tapered outer peripheral surface 46 tapered to essentially the same degree as the inner surface 36 of the tubular member 32 of the universal cartridge 2. The main body 44 is also provided with a tapered inner periphery 47, the greatest thickness of the wall portion between the peripheries 46 and 47 being located adjacent a radially extending flange portion 48 adapted to fit snugly into the open end 33 of the tubular portion 32 of the universal cartridge, and having a radially extending flange 49 that abuts the open end 33 of the tubular portion 32 as shown.

The inner and outer peripheral surfaces 46 and 47 converge toward the opposite end of the pressure equalizer member 42 and terminate in a mounting and sealing end portion 51 the outer periphery 52 of which is generally cylindrical and dimensioned in diameter and extent to form a fluid tight pressfit with the generally cylindrical seal surface 38 formed on the inner periphery of the tubular portion 32 of the universal cartridge 2. At the end of the pressure equalizer member 42 opposite the mounting and sealing portion 51, the tubular main body 44 is reduced in diameter in a coaxial tubular extension 53, the inner periphery 54 of which constitutes an extension of the tapered wall surface 47 of the main body. The tubular extension 53 continues to an annular wall portion 56 that extends transversely in relation to the tubular wall 53, and which is provided with a fluid delivery aperture 57 as shown. The fluid delivery aperture 57 is generally coaxially arranged with respect to the pressure equalizer member 42 and the tubular universal cartridge 2.

From the transverse wall 56, the pressure equalizer member is continued in a reduced diameter portion 58 that is generally cylindrical and which terminates in an open end 59 as shown. The tubular extension 58 defines a cylindrical cavity 61 within which is adapted to be mounted a marking "nib" or "point" designated generally by the numeral 62 as illuatrated in FIG. 2. The "nib" assembly or "point" 62 generally includes a cylindrical sleeve 63 from one end of which projects the marking point 64, while the other end is provided with an open end which is adjacent to and exposed to fluid flowing through the fluid flow aperture 57. The open end functions to channel fluid from the auxiliary reservoir 67, through the fluid flow aperture 57, and to the marking point 64, the end of which, equipped with an appropriate "point" or "nib" 68 is adapted to flow marking fluid onto the surface 69 of the media 71.

Referring to the main body portion 44 of the pressure equalizer member 42, there are provided on the exterior tapered surface 46 of the main body a multiplicity of coaxially arranged and longitudinally spaced annular fins 72, 73, 74, 76, 77, 78, and 79, formed integrally with the main body portion and extending radially outwardly from the main body for varying distances to provide a collective convergence of the outer peripheries corresponding to the convergence of the inner periphery 36 of the tubular extension 32 into which the pressure equalizer member is inserted and on which it may be mounted. It should be noted however that the collectively converging outer peripheries of the annular fins need not extend radially so far as to be contiguous with the tapered inner periphery 36 of the tubular extension, but may do so in appropriate circumstances.

As illustrated in FIGS. 2, 8, 9, and 16, there is provided in the main body 44 of the pressure equalizer member 42, positioned between the fins 71 and 72, a transverse passageway 81 that communicates the interior cavity formed by the tapered wall 47 of the member 42 with the exterior atmosphere. This occurs by virtue of the minute spaces that preferably exist between the outer peripheries of the fins and the inner tapered periphery 36 of the tubular wall 32. To insure in a primary and positive manner the equalization of pressure within the cavity formed by the tapered wall 47 of the member 42 and the exterior ambient pressure, the fins are provided with radially extending slots. Thus, commencing with the fin 72, it is noted that a slot 82 is provided, this slot being illustrated in FIGS. 2, 9 and 17–18, by the absence of cross-hatching in the area designated by the reference numeral 82.

In successively lower fins, for instance the fin 73, this fin is also provided with a slot 83, but the slot is diametrically opposed to the slot 82 in the fin 72 directly above. In like manner, the fin 74 is provided with a slot 84, the slot being on the same side of the member as the slot 82 and diametrically opposed to the slot 83. Thus, alternate fins have slots axially aligned on opposite sides of the pressure equalizer member 42, the fin 76, for instance, having a slot 86, the fin 77 having a slot 87 diametrically opposed to the slot 86, the fin 78 being provided with a slot 88 diametrically opposed to the slot 87 of the fin above, while the fin 79 is provided with a slot 89 which is in axial alignment with the slots 82, 84, and 87, all being on one side of the pressure equalizer member 42, while the slots 83, 86 and 88 are formed in the remaining fins but on the diametrically opposite side of the pressure equalizer member 42. To further enhance marking fluid flow through the aperture 57 by weakening surface tension of the marking fluid, ribs 89 are provided on the annular wall portion 56 as shown, the ribs having a sharp upper edge and extending into the inner periphery of the aperture 57 in portions 90.

Prior to insertion of the pressure equalizer member 42 into the tapered bore of the tube portion 32, there is inserted into the tapered bore formed by the converging wall 47 of the pressure equalizer member 42, the body of the marking fluid flow regulator designated generally by the numeral 43. This component is shown in assembled form in FIGS. 2 and 16-18 and apart from any other structure in FIGS. 5, 6 and 7.

Referring to FIGS. 2, 5, 6 and 7, it will there be seen that the marking fluid flow regulator includes a tubular, generally conical main body portion 91, generally symmetrical about a longitudinal axis, and including a tapered outer periphery 92 and similarly tapered inner periphery 93. Formed on the upper end of the tapered marking fluid flow control body as viewed in FIG. 5, there is provided two coaxially arranged cylindrical seal portions 94 and 96, the seal portion 94 having a cylindrical outer seal surface 97, while the seal portion 96 has a cylindrical outer seal surface 98. Projecting axially from the seal portion 94 are a plurality of abutments 99, conveniently four in number spaced equally circumferentially about the central axis of the member as illustrated in FIG. 7. Formed integrally with the inner tapered peripheral surface 93 of the member, are a plurality of longitudinally extending and circumferentially equally spaced elongated ribs 101, each of which projects radially inwardly toward the central axis of the conically tapered member, the ribs 101 having a sharp inner edge 102 which function to reduce the surface tension of the marking fluid as it passes through the tapered passageway formed by the inner peripheral tapered walls 93. The elongated ribs 101 extend the full length of the interior passageway of the member as shown.

Formed about the conically tapered body just below the seal portion 96 thereof, is an annular vent groove 103, defined at its upper end by the seal portion 96 and defined at its lower end by a radially extending annular flange or fin 104 formed integrally on the outer tapered surface 92 of the conically tapered body. The radially extending fin is only one of a series of such fins, the remaining fins being numbered 106, 107, 108, 109, 112, 113, 114 and 116 in descending order as illustrated in FIG. 5. It is important to note that these multiplicity of fins are separated axially from one another by an amount of approximately 0.025" and that the fins themselves have a material thickness of about the same amount. It is also important to note that the diametric dimension of the successive fins diminishes so that collectively, the outer peripheries taper from the largest diameter fin 104 to the smallest diameter fin 116. Below the fin 116, the tubular flow control member terminates in a generally cylindrical tubular extension portion 117 the end of which remote from the associated fin 116 is provided with an open end 118.

To facilitate the circulation of air and the equalization of pressure within the marking fluid delivery mechanism of which the flow control member 43 forms a part, each of the fins 104, 106-109, and 112-116, is provided with a slot 119 that extends from the periphery of the associated fin to the periphery of the tapered exterior surface 92 of the member. This construction is illustrated in FIGS. 5 and 6. In the interest of brevity in this description, it is noted that each of the fins is provided with such a slot 119, and that the slots on adjacent fins are positioned on diametrically opposite sides of the central axis. This arrangement is clearly illustrated in FIG. 2 by the absence of cross-hatching where the cutting plane passes through each fin at the location of a slot, and in FIG. 5 where the slots in alternate fins are shown in full lines. The flow control member 43, thus formed, is proportioned to be inserted into the interior of the equalizer member 42 as illustrated in FIG. 2, and 16-18. When so inserted, the seal surface 98 of the seal portion 96 of the flow control member 43 forms a fluid-tight press-fit union with inner cylindrical surface 121 formed on the terminal end portion 51 of the outer tapered pressure equalizer member 42. When thus inserted, the annular groove 103 formed in the outer periphery of the flow control member 43 lies in registry with the vent aperture 81 of member 42, and collectively the outer peripheries of the fins formed on the flow control member 43 lie closely adjacent the inner peripheral surface 47 of the outer conical pressure equalizer member 42, but need not engage that surface, yet may if so desired. Accordingly, since the end flange 48 of the pressure equalizer member 42 is provided with an air circulation port 122 as shown in FIGS. 2 and 8-10, air at atmospheric pressure enters through the port 122, circulates through the first groove defined between the flange 48 and the fin 79, passes upwardly through the slot 89 and into the annular channel defined between the fin 79 and the next succeeding fin 78, etc., until air passes through the port 81 into the channel 103, and circulates downwardly around the outer peripheral surfaces of the flow control member 43 for a purpose which will hereinafter be explained.

It should be understood that the assembly of the tapered outer tubular member 42, constituting the pressure equalizing member, with the inner conically tapered flow control member 43, is effected prior to the assembly being inserted into the open end 33 of the tubular portion 32 of the universal cartridge tube 2. When assembled, the cylindrical seal surfaces 98 and 121 are press-fitted together in a fluid-tight manner.

After assembly, the assembled unit is then inserted into the open end 33 of the tubular portion 32 and the cylindrical seal surface 97 is press-fitted into fluid-tight contact with the cylindrical seal surface 17 formed in the reduced-diameter tube section 29 as shown. Prior to insertion of the fluid delivery assembly into the tubular member 32, the seal plug 12 occupies the position illustrated in FIG. 3, and has its outer peripheral seal surface 16 press-fitted to the cylindrical seal surface 17. Upon insertion of the now assembled marking fluid delivery assembly into the tubular portion 32, the upper surfaces 123 of the abutment members 99 impinge against the lower surface 124 of the seal plug 12 and upon the application of sufficient axially directed insertion force on the fluid delivery assembly, the seal plug 12 is displaced from its fluid-tight union with the seal surface 17 and the cylindrical seal surface 98 of the flow control member 43 is now substituted in its place.

Thus, in one motion, the seal plug 12 is unseated or freed from its fluid-tight position and the marking fluid delivery assembly is inserted and mounted in a fluid-tight manner with the seal surface 17 so that marking fluid 3 from the main marking fluid reservoir cavity 8 may now flow through the central passageway of the flow control member 43. Since the specific gravity of the synthetic resinous material from which the seal plug 12 is formed is less than the specific gravity of the marking fluid, after the seal plug 12 is displaced from its fluid-tight union with the tube portion 29, the buoyancy of the seal plug causes it to rise through the marking fluid to the top of the column of fluid. It is for this reason, as previously explained, that the outer peripheral surface 18 of the seal plug is of lesser diameter than the inner peripheral surface 19 of the reservoir cavity 8.

Complete and proper insertion of the marking fluid delivery system or assembly is achieved when the radially extending flange 49 abuts the open end edge of the tubular portion 32 as shown in FIGS. 2 and 16–18. Immediately that the seal plug 12 is displaced from its fluid-tight union with the tube portion 29, marking fluid flows downwardly from the reservoir cavity, fills the tapered passageway 126 of the flow control member 43 and flows out of the open end 118 and into the larger diameter auxiliary reservoir cavity 67. The auxiliary reservoir cavity 67 is formed by the lower end portion of the tubular extension 53, and it should be noted that the diameter of the inner peripheral surface 54 of this tubular extension 53 is greater than the outer peripheral diameter of the cylindrical end portion 117 of the flow control member 43. Additionally, it should be noted that the lower open end 118 of the tubular portion 117 is elevated above the transverse wall 56 and that the passageway 57 through the transverse wall 56 is coaxially related with the open end 118 of the flow control member. As illustrated in FIGS. 17 and 18, the elevation of the open end of tubular member 117 above the transverse wall 56 may be varied to provide versatility in the marking fluid delivery systems useable, and to control marking fluid flow characteristics. This arrangement provides an annular passageway or cavity 127 that surrounds the terminal end portion 117 of the flow control member 43 as shown, the upper extremity of this cavity 127 being defined by the lowermost fin 116, the height of which in relation to the open end 118 may be varied. When the marking fluid fills the auxiliary reservoir cavity 67, there is provided an annular surface 128 on the top of the body of marking fluid filling the auxiliary reservoir cavity 67 that is exposed to atmospheric pressure air that fills the annular passageway or cavity 127, which is of course in communication through the groove 103 and the port 81 with the port 122 that opens into the atmosphere. Experience has shown that the level of the fluid in the auxiliary reservoir cavity 67 remains at about the level indicated, i.e., just slightly above the lower end edge of the open end 118 of the tubular portion 117. I have found also that the marking fluid in the annular cavity 127 forms a concave miniscus between the inner peripheral surface 54 of member 53 and the outer peripheral surface 129 of the tubular cylindrical fluid flow control portion 117. Since the spacing between these two adjacent surfaces amounts to only about 0.0125" and, since a concave miniscus is formed between these two surfaces, it is believed that capillarity exists with respect to the marking fluid in its relationship with the surfaces in question, and that the affinity of the marking fluid for the associated surfaces is greater than the surface tension of the marking fluid.

A surprising phenomenon of this arrangement is that so long as the marking point 68 is not in contact with the media there is no tendency for the marking fluid to flow freely from the marking point. However, as soon as the plotter pen is put to use, marking fluid flows through the aperture 57, and out of the marking point onto the surface 69. As fluid is drawn from the auxiliary reservoir 67, the annular generally horizontal surface 128 of the body of marking fluid within the annular cavity 127 changes its shape due to atmospheric air pressure and the outer periphery tends to recede out of the annular capillary space 127, with the inner periphery of the annular surface of the marking fluid tending to adhere to the end surface of the tubular portion 117, while the outer periphery creeps down the inner peripheral surface 54 of the cavity. This relationship is shown in FIG. 2(A). As additional marking fluid is drawn from the auxiliary reservoir 67, the outer peripheral edge of the body of fluid in the auxiliary reservoir progressively recedes further as illustrated in FIG. 2(A), with the inner periphery shifting radially inwardly to the edge of the inner periphery of the member 117. The action of withdrawing the marking fluid from the auxiliary reservoir 67 creates a partial vacuum above the column of marking fluid in the main reservoir cavity 8. Continued withdrawal of the marking fluid from the auxiliary reservoir 67 results in the atmospheric pressure of air in the annular passageway 127 overcoming the surface tension of the marking fluid and overcoming its affinity for the surface of the member 117 to which it clings, with the result that air at atmospheric pressure forces its way through the fluid adhering to the end surface of the tubular portion 117 in the form of minute bubbles 131. Since a partial vacuum has been drawn on the interior of the main supply cavity 8, by the withdrawl of marking fluid, it results that the stream of minute air bubbles pass upward through the marking fluid in the passageway 126 to relieve the partial vacuum above the column of marking fluid. As this continually occurs, marking fluid flows smoothy and consistently downwardly out of the open end of the tubular portion 117. In this way, marking fluid in the auxiliary reservoir 67 is never exhausted until the main reservoir runs dry, and the process is a continuous one as the plotter pen moves over the surface 69 of media 71 and marking fluid is dispensed.

Another surprising result of this design is that when the plotter pen is laid aside in a horizontal attitude, marking fluid from the auxiliary reservoir cavity 67 flows into the annular passageway 127 until it encounters the first radially extending fin 116, and is impeded thereby. The marking fluid will then spread around the end portion 117, and pass through the slot 119 into the groove between the fins 116 and 114. It is conceivable, but highly unlikely, that the grooves between all of the fins could be filled with marking fluid. In the unlikely event that this did occur, against the force of atmospheric pressure, the marking fluid would not leak from the plotter pen because it would have to find its way through port 81 and then pass progressively down through the annular grooves around the member 42. When the plotter pen is again placed erect in a position of use, whatever marking fluid has spread axially along the flow control member is retained therein temporarily and recedes therefrom only as rapidly as the marking fluid is dispensed by the marker point. Stated another way, fluid is drawn into the auxiliary reservoir from between the fins before it is drawn from the main reservoir. I have found that with this construction it is virtually impossible to make the plotter pen leak marking fluid, and there is no tendency for the marking fluid to flow freely from the plotter pen when the pen is laid in a horizontal attitude.

In another aspect of the invention, the fluid delivery assembly designated generally by the numeral 41 and illustrated in FIGS. 2 and 16–18, is omitted from the universal cartridge tubular extension 32 and is replaced by the insert illustrated in FIGS. 12–15 and designated generally by the numeral 132. The surprising advantage that results from this substitution is that the insert 132 may be utilized to operationally support either a fiber, a plastic or a roller ball type marking point, drawing marking fluid from a conventional fibrous reservoir contained within the cartridge tube 2. To my knowledge, no other plotter pen has this versatility of providing a universal insert for reception of these different types of marking points in a plotter pen.

Referring to FIGS. 12, 13, 14 and 15, it will be seen that the insert 132 is fabricated from a high strength synthetic resinous material and is generally symmetrical about a longitudinal axis 133. The insert is tubular as shown, and includes a tubular mounting portion 134 having a tapered outer peripheral surface 136 adapted to mate sealingly with the tapered inner peripheral surface 36 of the tubular extension 32 on the universal cartridge 2. An appropriate solvent applied to these mating surfaces prior to their mating bonds the two surfaces together permanently in a fluid-tight manner. The radially extending flange 137 abuts the open end of the tubular portion 32, and when this occurs it is visually observed that the insert is properly inserted. The mounting section 136 is tubular as shown, having an inner tapered peripheral surface 138 on which are integrally formed a plurality of longitudinally extending ribs 139 which insure a venting passageway through the structure when used with a fibrous reservoir. I have found that three such ribs spaced 120° provide satisfactory results.

Below the mounting portion 134, the tubular insert is provided with a reduced in diameter portion 141 having a generally cylindrical inner peripheral surface 142 that defines a cylindrical cavity 143 that communicates with the cylindrical cavity 144 formed by the inner peripheral walls 138 of the mounting portion 134. Below the intermediate cylindrical portion 141, the passageway or cylindrical cavity 143 continues in passageway or cavity 146 formed by the inner peripheral walls 147 of the lowermost tubular portion 148 as shown. This tubular portion, adjacent its open end 149, is provided with an inner peripheral surface 151 that is increased in diameter beyond the diameter of the cavity or passageway 146. This provides a shoulder 152 between the passageway 146 and the lowermost mounting cavity 153 as shown. The cylindrical cavities 146 and 153 are both utilized for the insertion of appropriate types of marking points (not shown) be they fiber, plastic or roller ball type marking points. These diverse types of marking points are manufactured by others and are commercially available.

To facilitate mounting of these diverse marking points, as seen in FIG. 15, the cavities 153 and 146 are generally triangular in their configuration as shown.

Having thus described the invention, what is believed to be new and novel and sought to be protected by letters patent of the United States is as follows.

I claim:

1. A universal plotter pen having improved marking fluid flow characteristics, comprising:
   (a) a cartridge having tubular walls closed at one end and open the other end and having a seal ring therewithin intermediate the closed and open ends and a cavity therewithin constituting a reservoir for marking fluid and defined between the seal ring and said closed end;
   (b) a delivery system for marking fluid mounted in the open end said cartridge in sealing engagement with said seal ring and including an elongated unobstructed passageway extending axially therethrough and communicating with said cavity constituting said marking fluid reservoir, whereby marking fluid may flow unobstructed from said reservoir through said passageway;
   (c) an auxiliary reservoir cavity for marking fluid within said delivery system and communicating with said axially extending unobstructed passageway to receive marking fluid therefrom; and
   (d) a plotting point mounted on said marking fluid delivery system in communication with said auxiliary reservoir cavity, whereby marking fluid deposited by said plotting point is drawn from said auxiliary reservoir.

2. The combination according to claim 1, in which said tubular cartridge is elongated and symmetrical about a longitudinal axis.

3. The combination according to claim 1, in which said tubular cartridge is elongated and cylindrical about a longitudinal axis.

4. The combination according to claim 1, in which said tubular cartridge is formed from a synthetic resinous material having elastically deformable walls responsive to the application of a radially inwardly directed force.

5. The combination according to claim 1, in which said cavity constituting a reservoir within the tubular cartridge contains a body of marking fluid.

6. As an article of manufacture, a marking fluid delivery system for a plotter pen adapted for use in conjunction with a disposable cartridge filled with a marking fluid to be applied by said plotter pen, the combination comprising:
   (a) an outer mounting member adapted to be mounted in said disposable cartridge;
   (b) an inner flow-control member sealingly mounted coaxially on said outer mounting member and including an elongated unobstructed passageway therethrough for the passage of marking fluid;
   (c) a reservoir cavity formed within the delivery system and communicating with said elongated unobstructed passageway; and
   (d) means on the outer mounting member adjacent said reservoir cavity and communicating therewith for channeling marking fluid from said reservoir cavity to a surface to be plotted.

7. The combination according to claim 6, in which said means for channeling marking fluid from said reservoir to said surface to be plotted comprises a plotting point.

8. The combination according to claim 6, in which said outer mounting member comprises an elongated tubular member having generally conical inner and outer peripheries, and said inner flow-control member comprises an elongated tubular member having a generally conical outer periphery, an annular portion of the outer periphery of the inner flow-control member sealingly engaging an annular portion of the inner periphery of the outer mounting member.

9. The combination according to claim 8, in which a mulitiplicity of radially outwardly extending axially spaced fins are integrally formed on the outer conical peripherey of said inner flow-control member, said fins having outer peripheries collectively conforming to the surrounding inner periphery of said outer mounting member.

10. The combination according to claim 8, in which a multiplicity of radially outwardly extending axially spaced integral annular fins are formed on the outer conical periphery of said outer mounting member.

11. The combination according to claim 9, in which each of said fins in provided with a slot extending radially from its outer periphery to the conical surface from which the fin projects.

12. The combination according to claim 10, in which each of said fins is provided with a slot extending radially from its outer periphery to the conical surface from which the fin projects.

13. The combination according to claim 11, in which the slots on adjacent fins are located on opposite sides of the longitudinal axis.

14. The combination according to claim 12, in which the slots on adjacent fins are located on opposite sides of the longitudinal axis.

15. The combination according to claim 8, in which passageway means are provided on said outer mounting member and said inner flow-control member admitting air at atmospheric pressure from the outer periphery of the outer mounting member to the inner periphery thereof and the outer periphery of said inner flow-control member.

16. A universal plotter pen having improved marking fluid flow characteristics, comprising:
(a) a cartridge having tubular walls closed at one end and open at the other end and having a seal ring therewithin intermediate the closed and open ends and a cavity therewithin constituting a reservoir for marking fluid and defined between the seal ring and said closed end;
(b) a delivery system for marking fluid mounted in the open end of said cartridge in sealing engagement with said seal ring and including an elongated unobstructed passageway extending axially therethrough and communicating with said cavity constituting said marking fluid reservoir, whereby marking fluid may flow unobstructed from said reservoir through said passageway;
(c) an auxiliary reservoir cavity for marking fluid within said delivery system and communicating with said axially extending unobstructed passageway to receive marking fluid therefrom;
(d) a plotting point mounted on said marking fluid delivery system in communication with said auxiliary reservoir cavity, whereby marking fluid deposited by said plotting point is drawn from said auxiliary reservoir; and
(e) said tubular cartridge is provided with a thickened annular wall portion intermediate said open and closed ends.

17. A universal plotter pen having improved marking fluid flow characteristics, comprising:
(a) a cartridge having tubular walls closed at one end and open at the other end and having a seal ring therewithin intermediate the closed and open ends and a cavity therewithin constituting a reservoir for marking fluid and defined between the seal ring and said closed end;
(b) a delivery system for marking fluid mounted in the open end of said cartridge in sealing engagement with said seal ring and including an elongated unobstructed passageway extending axially therethrough and communicating with said cavity constituting said marking fluid reservoir, whereby marking fluid may flow unobstructed from said reservoir through said passageway;
(c) an auxiliary reservoir cavity for marking fluid within said delivery system and communicating with said axially extending unobstructed passageway to receive marking fluid therefrom;
(d) a plotting point mounted on said marking fluid delivery system in communication with said auxiliary reservoir cavity, whereby marking fluid deposited by said plotting point is drawn from said auxiliary reservoir; and
(e) said tubular cartridge is provided with an annular groove surrounding the outer periphery thereof intermediate said open and closed ends.

18. A universal plotter pen having improved marking fluid flow characteristics, comprising:
(a) a cartridge having tubular walls closed at one end and open at the other end and having a seal ring therewithin intermediate the closed and open ends and a cavity therewithin constituting a reservoir for marking fluid and defined between the seal ring and said closed end;
(b) a delivery system for marking fluid mounted in the open end of said cartridge in sealing engagement with said seal ring and including an elongated unobstructed passageway extending axially therethrough and communicating with said cavity constituting said marking fluid reservoir, whereby marking fluid may flow unobstructed from said reservoir through said passageway;
(c) an auxiliary reservoir cavity for marking fluid within said delivery system and communicating with said axially extending unobstructed passageway to receive marking fluid therefrom;
(d) a plotting point mounted on said marking fluid delivery system in communication with said auxiliary reservoir cavity, whereby marking fluid deposited by said plotting point is drawn from said auxiliary reservoir; and
(e) said delivery system includes an outer mounting member and an inner flow-control member coaxially arranged about said elongated unobstructed passageway extending through said delivery system.

19. The combination according to claim 18, in which said outer mounting member is formed with generally conical inner and outer peripheries.

20. The combination according to claim 18, in which said inner flow-control member contains said elongated unobstructed passageway and is formed with a generally conical outer periphery.

21. The combination according to claim 18, in which an outer peripheral portion of said inner flow-control member sealingly engages an inner peripheral portion of said outer mounting member.

22. The combination according to claim 19, in which a multiplicity of radially extending axially spaced fins are formed on the outer conical periphery of said outer mounting member.

23. The combination according to claim 20, in which a multiplicity of radially extending axially spaced fins are formed on the outer conical periphery of said inner flow-control member.

24. The combination according to claim 18, in which said outer mounting member is sealingly mounted in the open end of said tubular cartridge.

25. The combination according to claim 18, in which said inner flow-control member is sealingly mounted on said seal ring within said tubular cartridge.

26. The combination according to claim 22, in which a slot is formed in each fin formed on the outer periphery of said outer mounting member.

27. The combination according to claim 23, in which a slot is formed in each fin formed on the outer periphery of said inner flow-control member.

28. The combination according to claim 18, in which an air inlet passageway is formed in said inner flow-control member adapted to admit air at atmospheric pressure into the space surrounding said inner flow-control member.

29. The combination according to claim 18, in which an air inlet passageway is formed in said outer mounting member adapted to admit air at atmospheric pressure into the space surrounding said outer mounting member.

30. The combination according to claim 18, in which a passageway is provided between said outer mounting member and said inner flow-control member adapted to admit air at atmospheric pressure from the space surrounding the outer periphery of said outer mounting member to the space surrounding the outer periphery of said inner flow-control member, whereby atmospheric pressure is imposed on the marking fluid within said auxiliary reservoir cavity.

31. The combination according to claim 18, in which said outer mounting member is formed with a hollow conical interior cavity open at one end and closed at the other end by a transverse wall intermediate the ends of the outer mounting member, a passageway formed in said transversve wall for the passage of marking fluid therethrough, said inner flow-control member containing said elongated unobstructed passageway mounted sealingly within said outer mounting member and having an outlet end spaced axially from said transverse wall and spaced radially inwardly from the inner periphery of said outer mounting member to define an annular passageway therebetween, whereby air at atmospheric pressure may pass through said annular passageway and into the outlet end of said elongated unobstructed passageway through the marking fluid therein and into the marking fluid reservoir contained in said cartridge to thereby provide atmospheric pressure in said reservoir above the marking fluid contained therein.

32. The combination according to claim 31, in which said auxiliary reservoir cavity in said delivery system is disposed between said inner flow-control member and said outer mounting member.

33. The combination according to claim 31, in which said auxiliary reservoir cavity communicates at one end with said elongated unobstructed passageway in said inner flow-control member and at its other end with said passageway formed in said transverse wall of said outer mounting member.

34. The combination according to claim 33, in which said plotting point is mounted in said outer mounting member in the end thereof adjacent said auxiliary reservoir cavity, and includes means for drawing marking fluid from said auxiliary reservoir cavity.

35. As an article of manufacture, a cartridge for a disposable plotter pen including a marking fluid delivery system comprising:
 (a) an elongated tubular body closed at one end and open at the other end and generally symmetrical about a longitudinal axis;
 (b) a seal ring within said tubular body intermediate said closed and open ends and with said open end of the elongated tubular body defining a mounting means for said marking fluid delivery system when it is applied to said elongated tubular body;
 (c) a seal plug sealingly and removably mounted on said seal ring within said tubular body and with said closed end defining a fluid-tight reservoir cavity within said tubular body;
 (d) a body of marking fluid filling said reservoir cavity;
 (e) said seal plug being dislodged from said seal ring by insertion of said marking fluid delivery system into the open end of said tubular body for sealing engagement with said seal ring.

36. The combination according to claim 35, in which said tubular body is formed from synthetic resinous material, and said seal ring is integral with said tubular body.

37. As an article of manufacture, a disposable cartridge for a plotter pen, comprising:
 (a) an elongated tubular body closed at one end and open at the other end and generally symmetrical about a longitudinal axis;
 (b) a seal ring within said tubular body intermediate said closed and open ends;
 (c) a seal plug sealingly and removably mounted on said seal ring within said tubular body and with said closed end defining a fluid-tight reservoir cavity within said tubular body;
 (d) a body marking fluid filling said reservoir cavity; and
 (e) said tubular body is provided with an annular groove intermediate the closed and open ends thereof and surrounding the outer periphery of the tubular body.

38. As an article of manufacture, a disposable cartridge for a plotter pen, comprising:
 (a) an elongated tubular body closed at one end and open at the other end and generally symmetrical about a longitudinal axis;
 (b) a seal ring within said tubular body intermediate said closed and open ends;
 (c) a seal plug sealingly and removably mounted on said seal ring within said tubular body and with said closed end defining a fluid-tight reservoir cavity within said tubular body;
 (d) a body of marking fluid filling said reservoir cavity; and
 (e) said closed end of the tubular body is provided with an integral boss projecting axially into said tubular body.

39. As an article of manufacture, a disposable cartridge for a plotter pen, comprising:
 (a) an elongated tubular body closed at one end and open at the other end and generally symmetrical about a longitudinal axis;
 (b) a seal ring within said tubular body intermediate said closed and open ends;
 (c) a seal plug sealingly and removably mounted on said seal ring within said tubular body and with said closed end defining a fluid-tight reservoir cavity within said tubular body;
 (d) a body of marking fluid filling said reservoir cavity; and
 (e) said seal plug is provided with an integral boss projecting axially into said tubular body.

40. As an article of manufacture, a disposable cartridge for a plotter pen, comprising:
 (a) an elongated tubular body closed at one end and open at the other end and generally symmetrical about a longitudinal axis;

(b) a seal ring within said tubular body intermediate said closed and open ends;

(c) a seal plug sealingly and removably mounted on said seal ring within said tubular body and with said closed end defining a fluid-tight reservoir cavity within said tubular body;

(d) a body of marking fluid filling said reservoir cavity;

(e) said tubular body is formed from synthetic resinous material;

(f) said seal ring is integral with said tubular body;

(g) said seal ring is integrally formed on the inner periphery of said tubular body intermediate the closed and open ends thereof; and (h) said tubular body is provided with an annular groove formed in the outer periphery of the tubular body and coaxially surrounding the seal ring in a common plane.

* * * * *